No. 765,060. PATENTED JULY 12, 1904.
T. A. WILLARD.
STORAGE BATTERY.
APPLICATION FILED AUG. 13, 1903. RENEWED JUNE 1, 1904.
NO MODEL.
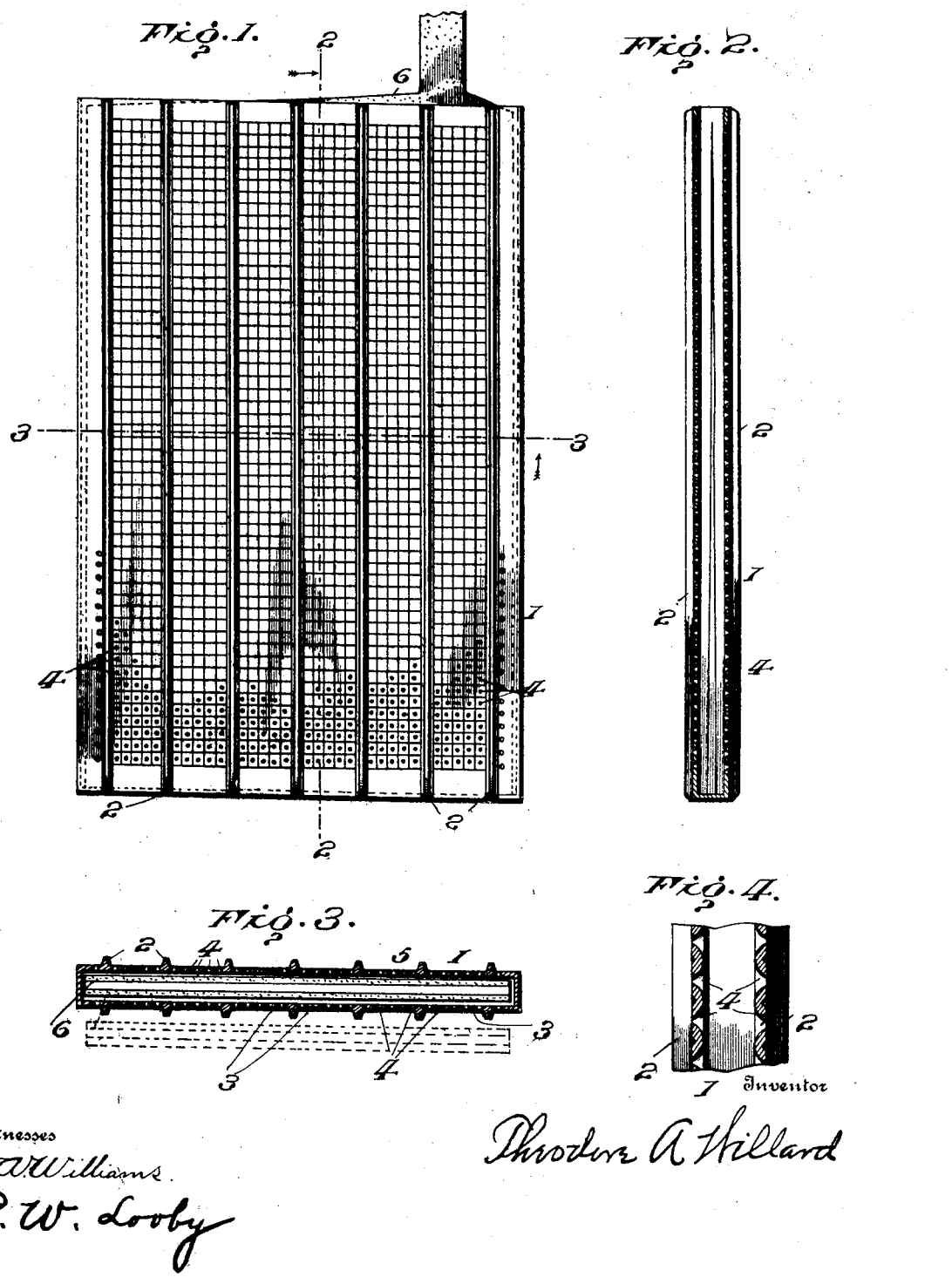
Witnesses
W. A. Williams
O. W. Looby
Inventor
Theodore A. Willard No. 765,060.                                                    Patented July 12, 1904.

UNITED STATES PATENT OFFICE.

THEODORE A. WILLARD, OF CLEVELAND, OHIO, ASSIGNOR TO WILLARD STORAGE BATTERY COMPANY, OF CLEVELAND, OHIO, A CORPORATION OF WEST VIRGINIA.

STORAGE BATTERY.

SPECIFICATION forming part of Letters Patent No. 765,060, dated July 12, 1904.

Application filed August 13, 1903. Renewed June 1, 1904. Serial No. 210,678. (No model.)

*To all whom it may concern:*

Be it known that I, THEODORE A. WILLARD, a citizen of the United States, residing at Cleveland, in the county of Cuyahoga and State of Ohio, have invented a new and useful Improvement in Storage Batteries, of which the following is a specification.

The general object of the invention is to enhance the general efficiency of the storage battery, and its special object is to provide a simple, inexpensive, and efficient non-conducting sheath which shall envelop the plate or electrode and whereof the general arrangement and construction shall be such as to insure a perfect and free circulation of the electrolytic fluid and prevent the displacement, falling apart, or disintegration of the active material of the electrode.

With these and other objects and advantages hereinafter discussed the invention consists in the improvements hereinafter specified and claimed.

The nature, characteristic features, and scope of the invention will be more clearly understood from the following description, taken in connection with the accompanying drawings, forming a part hereof, wherein—

Figure 1 is an elevational view of a non-conducting sheath, envelop, or casing embodying my invention and containing an electrode. Fig. 2 is a section taken on line of 2 2 of Fig. 1. Fig. 3 is a section taken on line 3 3 of Fig. 1; and Fig. 4 represents, on an enlarged scale, a portion of one of the side walls of the sheath or casing, showing the peculiar formation or shape of the perforations.

Referring to the drawings, 1 represents the improved sheath, envelop, or casing, which may be made of any suitable non-conducting material, although hard rubber has certain advantageous features over the others to commend its use. The said sheath is preferably formed in a matrix or mold and has integral side and bottom walls and is open at the top for the reception of the electrode. The side walls of the sheath are formed or provided with vertically-extending ribs 2, which when the several plates or elements of the battery are assembled constitute wells 3 for the free circulation of the battery fluid or electrolyte. The side walls are also provided with numerous perforations 4 for the passage of the electrolyte. The peculiar shape, contour, or formation of these perforations constitutes a principal feature of the invention. As clearly shown in the several figures, particularly in Fig. 4, the perforations are cone-shaped, the larger openings being on the inside of the sheath or casing. To effect this, the surface of the sheath is blown full of cone-like projections the points of which are subsequently ground off to complete the perforations. There are certain advantages attendant on this construction: First, the sheath is not deprived of any of its elasticity or of its natural structural strength, as is the case in the ordinary practice of perforating, so that it is enabled to follow the usual slight expansion or contraction of the plate without cracking or splitting, thereby preventing warping or bending of the plate or electrode and prolonging the life of the battery. Again, the peculiar cone shape of the perforations, with the larger openings on the inside of the sheath, renders them admirable supports for the active material of the electrode, said larger openings constituting pockets for the active material and presenting a greater surface area of the latter to the action of the electrolyte.

In Figs. 1, 2, and 3, 5 designates the active material or material or paste to become active applied on each side of the plate 6, and the whole is shown arranged within and supported by the sheath or envelop 1.

In practice it is sufficient to inclose every other plate or electrode, generally the positive, the negative plates or electrodes being separated therefrom by the ribs 2, leaving the wells 3 for the free circulation in a vertical direction of the electrolyte. It is manifest, however, that this arrangement might be reversed, or sheaths could be applied to all the plates or electrodes.

It will be obvious to those skilled in the art to which the invention relates that modifications may be made in details without departing from the spirit and scope of the invention. Hence I do not limit myself to the precise construction and arrangement of parts hereinbefore described, and illustrated in the accompanying drawings; but, Having described the nature and objects of the invention, what I claim as new, and desire to secure by Letters Patent, is—

1. A sheath, envelop or casing for the purpose stated, having cone-shaped perforations, substantially as specified.

2. A sheath, envelop or casing for the purpose stated, having cone-shaped perforations whereof the larger openings are on the inside of the sheath, substantially as specified.

3. A sheath, envelop or casing for the purpose stated, having cone-shaped perforations formed by blowing the surface of the sheath full of cone-like projections and grinding off the points, substantially as specified.

4. A sheath, envelop or casing for the purpose stated, formed of non-conducting material, having integral side and bottom walls, said side walls having vertical spacing-ribs exteriorly thereof and having cone-shaped perforations, substantially as specified.

5. A sheath, envelop or casing for the purpose stated, formed of non-conducting material, having integral side and bottom walls, said side walls having vertical spacing-ribs exteriorly thereof and cone-shaped perforations formed by blowing the surface of the sheath full of cone-like projections and grinding off the points, substantially as specified.

6. A sheath, envelop or casing for the purpose stated, formed of non-conducting material, having integral side and bottom walls, said side walls having vertical spacing-ribs exteriorly thereof and also having cone-shaped perforations whereof the larger openings are on the inside of the sheath, substantially as specified.

7. A sheath, envelop or casing containing a battery plate or electrode, said sheath formed of non-conducting material and having integral side and bottom walls, said side walls having vertical spacing-ribs exteriorly thereof and also having cone-shaped perforations whereof the larger openings are directed toward the interior of the sheath and constitute supports for the active material, substantially as specified.

In testimony whereof I have hereunto signed my name in the presence of two subscribing witnesses.

THEODORE A. WILLARD.

Witnesses:
H. S. GREINER,
R. G. SMITH.